United States Patent [19]

Ceauselu

[11] 4,182,243
[45] Jan. 8, 1980

[54] PLANT FOR PNEUMATIC TRANSPORT

[75] Inventor: Constantin O. Ceauselu, Bucharest, Romania

[73] Assignee: Institutul National Pentru Creatie Stiintifica Si Tehnica - Increst, Bucharest, Romania

[21] Appl. No.: 809,009

[22] Filed: Jun. 22, 1977

[30] Foreign Application Priority Data

Jul. 1, 1976 [RO] Romania .................... 86652

[51] Int. Cl.² ............... B61B 13/10; B65G 51/08
[52] U.S. Cl. ................. 104/138 R; 104/95;
104/111; 104/155; 105/154; 105/156; 105/365; 406/185
[58] Field of Search ............ 104/89, 95, 109, 111, 104/138 R, 155, 156, 247; 105/154, 156, 365; 243/4

[56] References Cited

U.S. PATENT DOCUMENTS

| 927,994 | 7/1909 | Moore | 104/247 X |
|---|---|---|---|
| 1,046,699 | 12/1912 | Whichello | 104/111 |
| 2,296,771 | 9/1942 | Crawford et al. | 104/138 R |
| 2,470,060 | 5/1949 | Webb | 105/156 X |
| 2,869,709 | 1/1959 | Zebley | 104/95 X |
| 3,563,179 | 2/1971 | Gorjanc | 104/95 |
| 3,870,250 | 3/1975 | Teodorescu et al. | 243/4 X |

FOREIGN PATENT DOCUMENTS

435739 10/1926 Fed. Rep. of Germany ........... 105/156

OTHER PUBLICATIONS

Larson et al., "Pneumatic Dispatch Article Handling", *IBM Technical Disclosure Bulletin*, vol. 15, No. 2, Jul. 1972, pp. 651, 652.

*Primary Examiner*—Randolph A. Reese
*Attorney, Agent, or Firm*—Karl F. Ross

[57] ABSTRACT

A pneumatic transport plant in which a plurality of aligned pneumatic tubes define a transport path, the tubes being spaced apart with an overhead rail in the form of an I-beam extending continuously along the path and through each tube, in which it is mounted by brackets flanking the rail and engaging the underside of the upper flange thereof, the brackets being bolted to the walls of the tubes. A vehicle riding along the rail is formed by an elongated container suspended beneath the rail by a plurality of support rollers flanking the rail and riding upon the lower flange thereof, the support rollers being mounted on a support carried on a vertical pivot formed at an end of the container, through the intermediary of a yoke having a horizontal pivot passing through the support and another horizontal pivot passing through the vertical pivot, allowing the support to tilt back and forth in the longitudinal direction of travel of the container and from side to side, transverse to the direction of travel, as well as to rotate in a horizontal plane. A plurality of guide rollers are also mounted on the support, flanking the rail and normally spaced therefrom for engagement therewith only during lateral displacement of the container.

2 Claims, 6 Drawing Figures

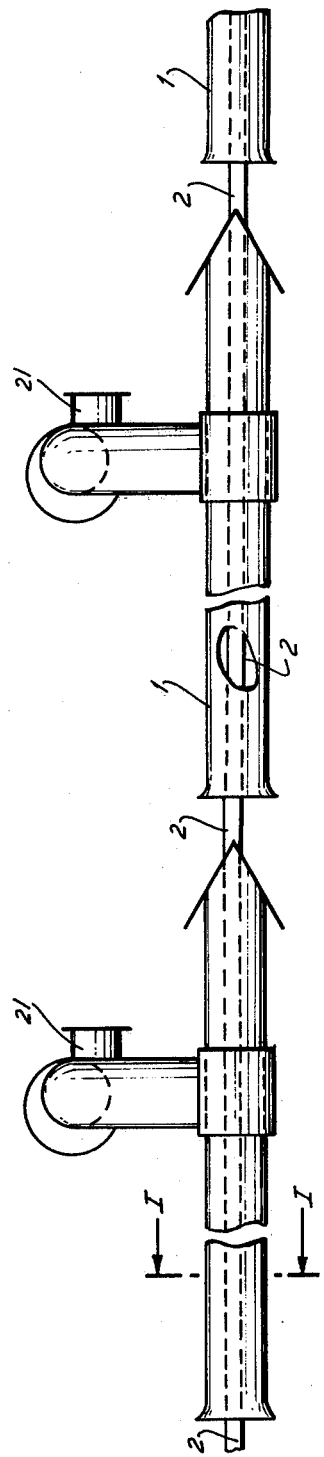
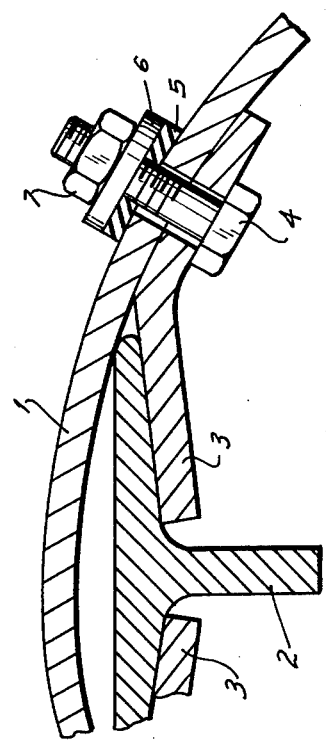
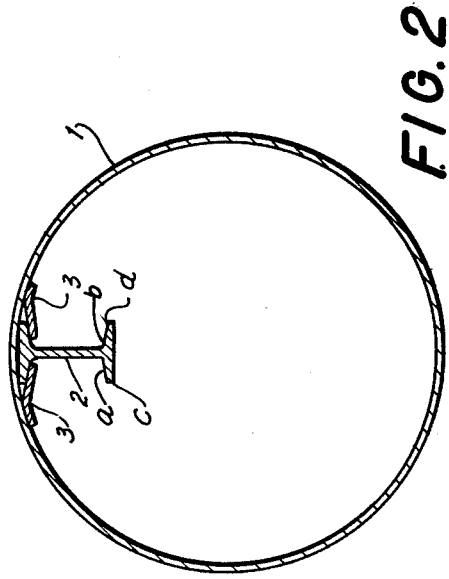

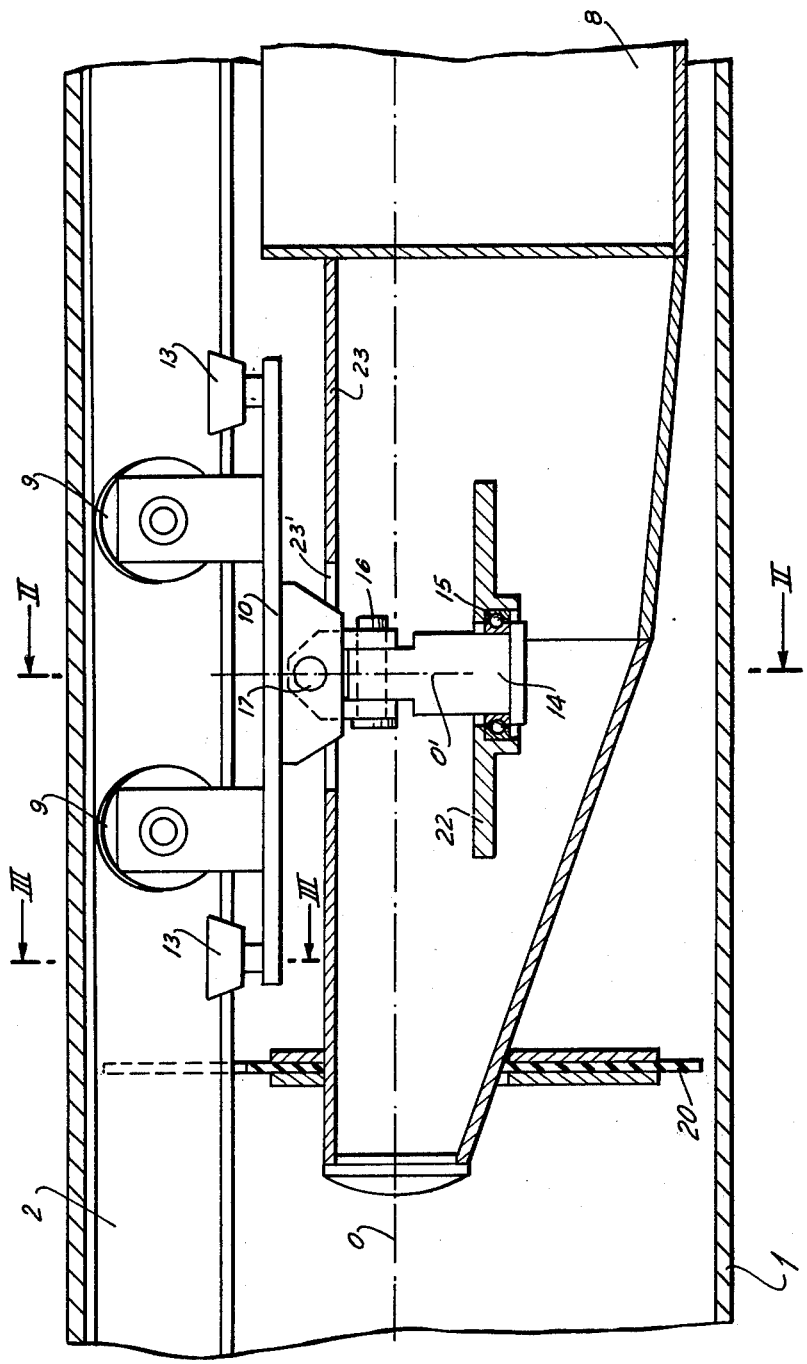

PLANT FOR PNEUMATIC TRANSPORT

FIELD OF THE INVENTION

The present invention relates to a plant for pneumatic transport that uses containers which carry materials or goods in tubes located on the ground, underground or above the ground.

BACKGROUND OF THE INVENTION

A known pneumatic device for the transport of loads within tubes comprises a number of tube stages having the cross section either circular, rectangular or square shaped, and are connected end-to-end in any convenient airtight fashion, for instance with sleeve joints, so as to form a single transport tube in which a plurality of rollers are mounted for the containers to run on.

Each of the rollers penetrates through an opening formed in the wall of the tube and projects inwardly beyond the inner surface of the tube. Thus a container, while running inside the tube, will contact only the rollers, without touching the wall. In each tube there are mounted in sets at certain intervals, in cross planes to the tube, three rollers, one at the bottom to support the weight of the containers and two at the sides which function to guide the containers. Each transport tube is provided with a vacuum chamber connected to an exhaust blower through a checkvalve or closure operated so as to be opened either by force accumulators or by electromagnets, or by levers provided with a roller. The electromagnets are controlled by an electromagnetic control block responsive to the presence of the container, while the levers are controlled by contact with the conical front end of the container. The passage of the container from one tube stage to the next is ensured by the opening of the checkvalve downstream of the container.

The device described above has the disadvantage in that the container while running inside the transport tube, may be displaced from the median axis of the transport tube.

OBJECTS OF THE INVENTION

It is therefore an object of the present invention to provide an improved pneumatic transport plant adapted to obviate the aforementioned disadvantage.

SUMMARY OF THE INVENTION

The present invention obviates the above mentioned disadvantage by the fact that the plant comprises a number of separated tube stages which include an overhead rail mounted by means of brackets each tube upper part of the stage. The rail in the form of an I-beam provides two tracks for a container to run on through the intermediary of at least two rollers placed at each end of the container. These rollers are mounted on a support by means of ball-bearings and axles. The support is provided in its turn with at least two rollers, a vertical pivot and two horizontal pivots, which are mutually perpendicular, and, on the support and on the median parts of the container, at least two lateral guide rollers mounted by means of radial bearings.

BRIEF DESCRIPTION OF THE DRAWING

The above and other objects, features and advantages of the invention will become more readily apparent from the following description, reference being made to the accompanying drawing, in which:

FIG. 1 is a schematic top view of the plant according to the invention;

FIG. 2 is a cross vertical view taken along line I—I of FIG. 1;

FIG. 3 is a detail of the cross section of FIG. 2 showing the mounting of the rail;

FIG. 4 is a longitudinal section in the vertical plane through the transport tube showing the rail and one end of the container, the other end being identical thereto;

SPECIFIC DESCRIPTION

Figure 5:
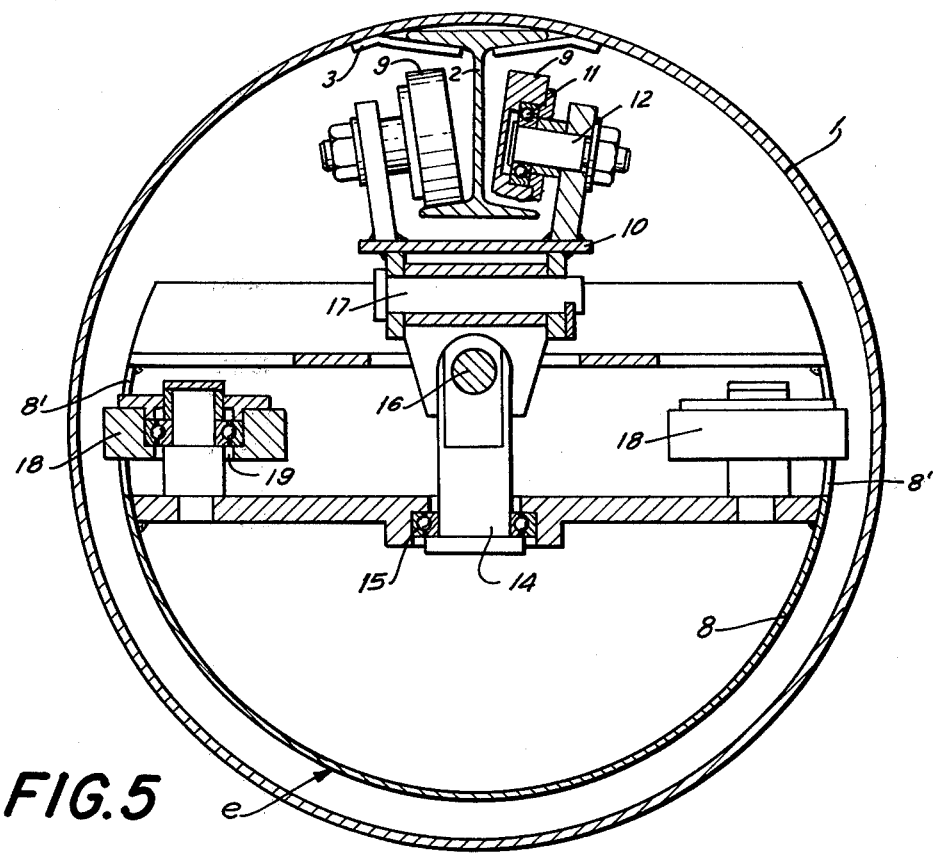
FIG. 5 is a cross sectional view taken along line II—II of FIG. 4.
Figure 6:
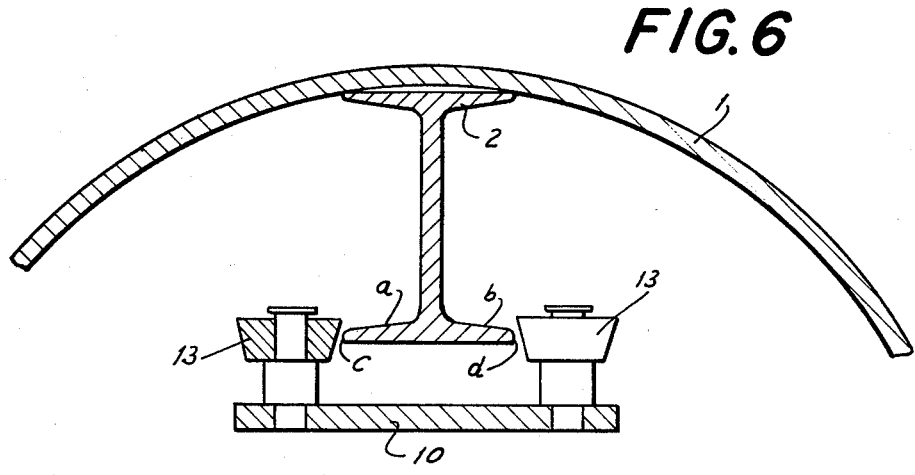
FIG. 6 is a cross sectional view taken along line III—III of FIG. 4.

According to the invention, the plant shown includes a number of tube stages 1 through which there extends a rail 2, formed as an I-beam mounted on the upper part of each tube stage by means of brackets 3, using bolt 4, rubber packings 5, packing plates 6, and bolt nuts 7 in such a way as to be removable and to ensure a perfect air tightness inside the transport tube against the ambient air. The rail 2 forms two tracks a and b on which an external container 8 runs by means of support rollers 9, four support rollers at each end, two on one side and two on the other side of the rail 2, the support rollers being mounted on a support 10 through the intermediary of ball-bearings 11 and axles 12. Four guide rollers 13 are also mounted on the support 10 flanking rail 2. These guide rollers 13, by their contact with the rail 2 on its edges c and d during lateral displacement of container 8, guide the support 10 with the support rollers 9, so as to make the latter run properly aligned on the tracks a and b. The support 10 constitutes a kind of bearing for the suspension of the container 8, a bearing which is formed by a vertical pivot 14 which extends through opening 23' of deck 23 and is provided with an axial ball-bearing 15 mounted on platform 22, a horizontal pivot 16 which is parallel to the longitudinal axis 0 of the container 8 and perpendicular to the axis 0' of vertical pivot 14, and another horizontal pivot 17 which is also perpendicular to the vertical pivot 14 and the horizontal pivot 16.

The suspension uses the three pivots placed in orthogonal positions, the aim being to obtain a high mobility between the support 10 and the container 8.

The container 8 is suspended from rail 2 in such a way as to be able to run through the tube without touching the wall. On the lateral sides and in the median plane of the container 8, there are two guide rollers 18 mounted by means of radial bearings 19 which extend through openings 8' in container 8 to engage the wall of tubes 1 only when the container 8 is laterally displaced. At each end of the container 8 there is a rubber packing 20 spaced from the wall of the tube and fastened by means of flanges in such a way as to effect an air tightness with minimal escapes between the upstream end and the downstream end of the container 8 in the transport tube 1, and, at the same time, not to cause a drag force, as a result of friction.

According to the present invention, the operation of the plant takes place as follows:

The loaded container 8 is displaced within the transport tube 1 by exhaust blowers 21, connected proximal to the downstream end of the tubes, as shown in FIG. 1; it is suspended from rail 2 and runs upon the two tracks a and b of the lower flange by means of the rollers 9, which take the entire weight of the container 8, and guide rollers 13, as well, the latter helping to guide the support 10 and the rollers 9 along the rail whichever direction the rail takes.

According to the present invention, the plant has the following advantages:

It allows the transport at higher speeds of large weights of materials and goods;

It uses containers of higher stability regardless of speed.

I claim:

1. A pneumatic transport plant comprising:

a plurality of spaced apart pneumatic tubes in alignment and defining a transport path;

a continuous overhead rail in the form of an I-beam extending continuously along said path and through each of said tubes and mounted therein, said rail being mounted within said tubes by a plurality of respective brackets flanking said rail and spaced therealong within said tubes, said brackets being bolted to the resepective wall of said tubes and airtight therewith and engaging the underside of the upper flange of said rail, said upper flange being held between said brackets and the respective wall of said tubes;

a respective exhaust blower connected to each of said tubes proximal to a downstream end thereof;

a vehicle riding along said rail, said vehicle comprising:

an elongated container suspended beneath said rail and displaceable therealong, said container having a first axis extending in the direction of travel, at least one vertical pivot formed at an end of said container and having a second axis intersecting said first axis, a first horizontal pivot mounted on said vertical pivot for rotation therewith about said second axis, said first horizontal pivot having a third axis intersecting said second axis and perpendicular thereto and parallel to said first axis, a yoke mounted on said first horizontal pivot and rotatable about said third axis and rotatable with said first horizontal pivot about said second axis, a second horizontal pivot mounted on said yoke above said first horizontal pivot, said second horizontal pivot having a fourth axis intersecting said second axis and perpendicular to said third axis, a support mounted on said second horizontal pivot for tilting about said fourth axis, a plurality of support rollers mounted on said support and flanking said rail, said support rollers riding upon the lower flange thereof, said lower flange defining two support surfaces, a plurality of first guide rollers mounted on said support, said guide rollers flanking said rail and normally spaced therefrom for engagement therewith only during lateral displacement of said container, a plurality of second guide rollers mounted on said container in the median plane thereof and spaced from the respective wall of said tubes for engagement therewith only during lateral displacement of said container, and packing means on said container for enabling said vehicle to be pneumatically displaced through said tubes;

at least one deck formed at an end of said container and having an opening formed therein; and a platform mounted in said container below said deck, said platform carrying said vertical pivot and said second guide rollers, said vertical pivot extending through said opening in said deck and said second guide rollers extending through respective openings formed in the wall of said container.

2. The plant defined in claim 1 wherein:

said support rollers flank said rail in first pairs, one of said first pairs being mounted on either side of said second axis along said rail; and said first guide rollers flank said rail in second pairs, one of said second pairs being mounted along said rail beyond each of said first pairs.

* * * * *